(12) United States Patent
Yoon

(10) Patent No.: US 7,580,173 B2
(45) Date of Patent: Aug. 25, 2009

(54) OPTICAL INFORMATION DETECTING METHOD AND OPTICAL INFORMATION DETECTOR

(75) Inventor: Pil-Sang Yoon, Suwon-si (KR)

(73) Assignee: Daewoo Electronics Corporation, Seoul (KR)

( * ) Notice: Subject to any disclaimer, the term of this patent is extended or adjusted under 35 U.S.C. 154(b) by 384 days.

(21) Appl. No.: 11/486,447

(22) Filed: Jul. 13, 2006

(65) Prior Publication Data

US 2007/0172156 A1      Jul. 26, 2007

(30) Foreign Application Priority Data

Dec. 22, 2005   (KR) .................. 10-2005-0127441

(51) Int. Cl.
*G02F 1/07* (2006.01)
(52) U.S. Cl. .................................. 359/263; 369/275.4
(58) Field of Classification Search ........... 359/263, 359/245, 238, 275.4, 106
See application file for complete search history.

(56) References Cited

U.S. PATENT DOCUMENTS

2007/0206485 A1*   9/2007   Yoon et al. ............... 369/275.4

* cited by examiner

*Primary Examiner*—Timothy J Thompson

(57) ABSTRACT

There is provided an optical information detecting method comprising: detecting an image of a source data page containing a frame mask by the use of an optical detection region within respective 1:N (where N is greater than 1) excessive detection pixels; monitoring a light intensity of the detected image and determining a matching state of the frame mask; determining an arrangement pattern of valid detection pixels of the detection pixels in accordance with the determined matching state of the frame mask and detecting sampling detection pixels; and sampling an image of the sampling detection pixels from the detected image and reproducing the image of the source data page. There is also an optical information detector used to put the optical information detecting method into practice. Accordingly, it is possible to detect optical information with high reliability without performing complex calculation by the use of a 1:N over-sampling method.

18 Claims, 15 Drawing Sheets

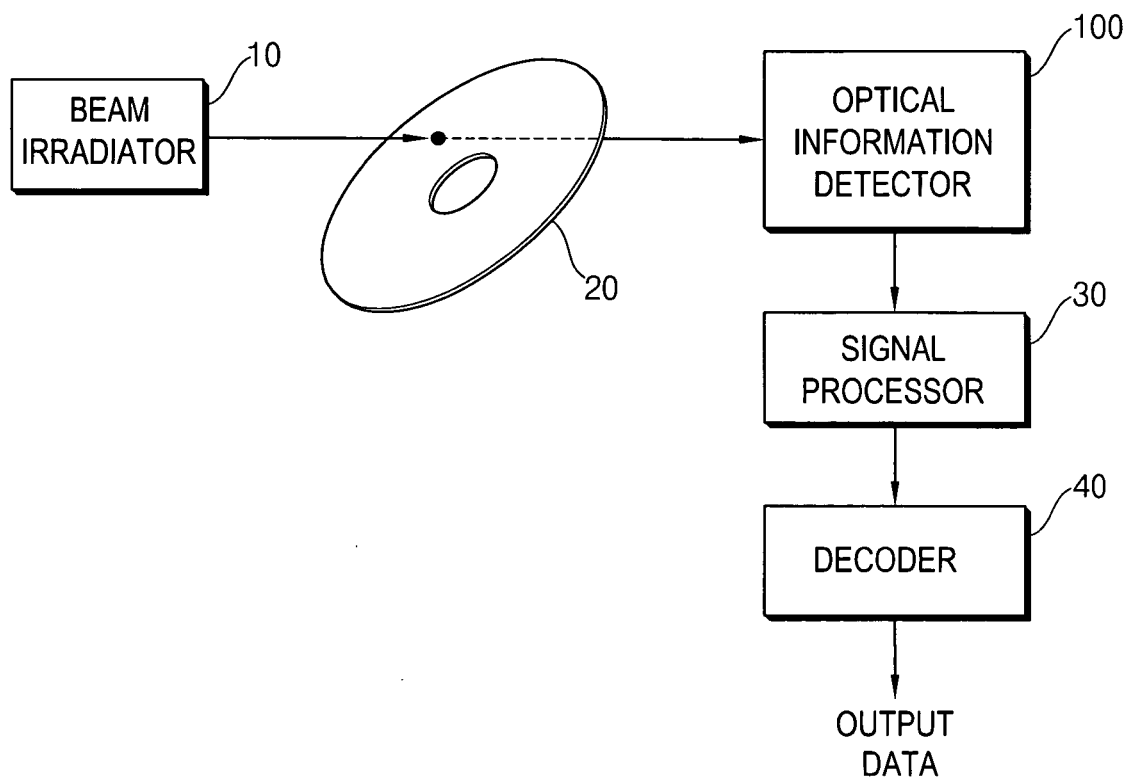
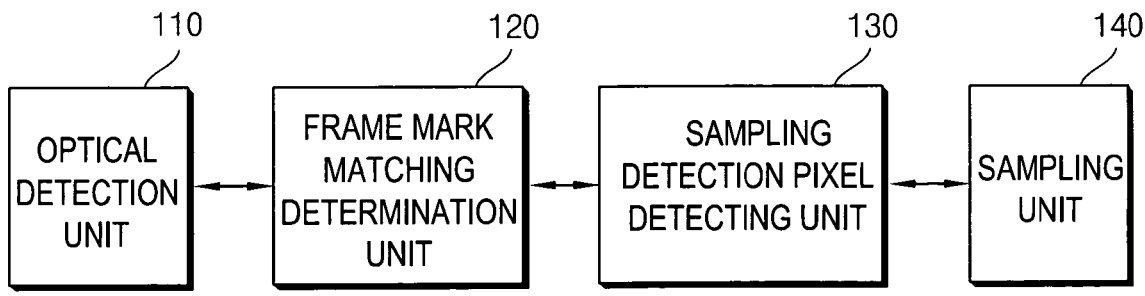

⬅ : VALID DETECTION PIXEL
⇐ : INVALID DETECTION PIXEL

← : VALID DETECTION PIXEL
⇐ : INVALID DETECTION PIXEL

← : VALID DETECTION PIXEL
⇐ : INVALID DETECTION PIXEL

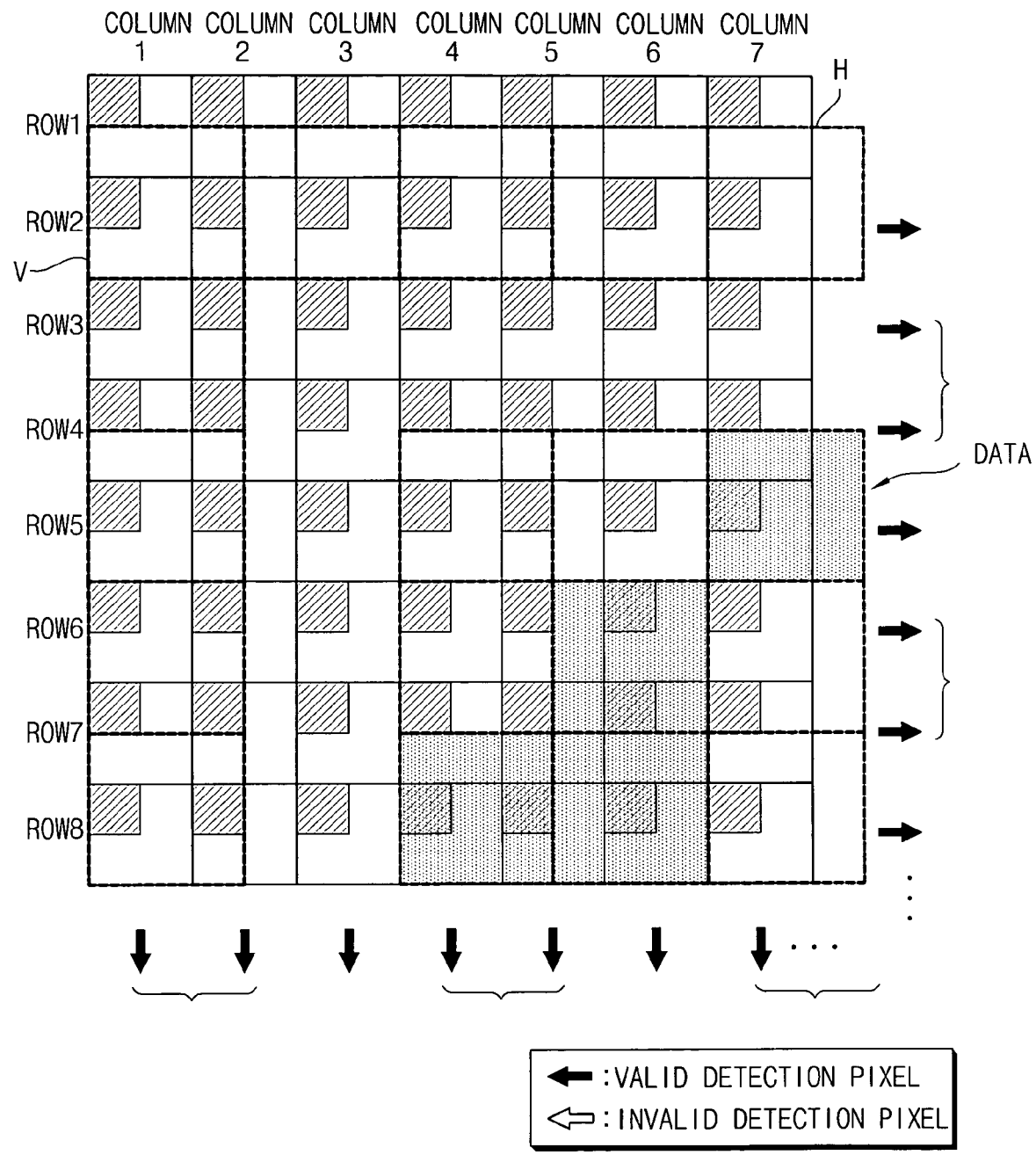

OPTICAL INFORMATION DETECTING METHOD AND OPTICAL INFORMATION DETECTOR

BACKGROUND

1. Technical Field

The present invention relates to an optical information detecting method and an optical information detector, and more particularly, to an optical information detecting method and an optical information detector which can efficiently detect optical information without complex calculation.

2. Related Art

Recently, with increase in requirement for a next-generation storage system having large storage capacity, an optical information processing system using holography, that is, a holographic optical information processing system, has attracted attention.

In the holographic optical information processing system, by irradiating a signal beam containing data and a reference beam at an angle different from that of the signal beam to a predetermined position of an optical information storage medium and intersecting two beams each other, an interference pattern is recorded in the optical information storage medium. At the time of reproducing the stored information, using diffracted beam generated from the interference pattern by irradiating the reference beam to the stored interference pattern, original data are reproduced.

In the holographic optical information processing system, data can be superposed and stored at the same position of the optical information storage medium by the use of a variety of multiplexing methods and the superposed and stored data can be separated and reproduced. Accordingly, it is possible to embody a data storage system with a super large capacity. Examples of the multiplexing methods can include an angular multiplexing method, a wavelength multiplexing method, and a phase code multiplexing method.

On the other hand, in the holographic optical information processing system, digital data are processed in units of predetermined pages and a page which is unit data is called a data page. That is, the holographic optical information processing system processes data in units of data pages. The optical information processing operation in units of data pages is described in detail in U.S. Pat. No. 670,923 and Japanese Unexamined Patent Publication No. 1998-97792.

For example, in the holographic optical information processing system, input data are encoded in units of data pages, the encoded binary data are allowed to correspond to pixels to create two-dimensional images of data pages, the two-dimensional images of data pages are loaded to a signal beam, and the signal beam is irradiated to the optical information medium. This optical modulation is carried out by a spatial light modulator (SLM).

At this time, a reference beam is irradiated to the optical information storage medium at an angle different from the irradiation angle of the signal beam. The signal beam and the reference beam interfere with each other in the optical information storage medium and the images of the data pages loaded to the signal beams are recorded in the form of interference patterns in the optical information storage medium.

The images of the data pages recorded in the optical information storage medium can be reproduced by irradiating the reference beam to the interference patterns. The reproduced images of the data pages can be detected by a light receiving device such as a complementary metal-oxide semiconductor (CMOS) or a charge coupled device (CCD). The detected images of the data pages are reproduced in original data through predetermined signal processing and decoding operations.

On the other hand, a variety of sampling methods as follows can be used for detecting the images of the data pages by the use of the light receiving device.

1. 1:1 Pixel Matching Method

A 1:1 pixel matching method is a method of matching pixels of the light receiving device (hereinafter, referred to as "light receiving pixels") with pixels of the reproduced image of the data page (hereinafter, referred to as "data pixels") in 1:1. In the 1:1 pixel matching method, since one data pixel corresponds to one light receiving pixel, the storage density is high at the time of detecting the image.

At the time of actually reproducing the image of the data page, the position of the reproduced image formed on the light receiving device varies due to shrinkage or rotation of the optical information storage medium, and misalignment is caused. Accordingly, the data pixels and the detection pixels are not matched with each other.

However, in the 1:1 pixel matching method, when two kinds of pixels depart from each other by a half or more size of the data pixel, the image of the data page detected by the light receiving device can be severely degraded. When the departure of pixels is severe, it is not possible to obtain accurate information.

2. 1:3 Over-sampling Method

A 1:3 over-sampling method is a method of detecting one data pixel by the use of 9 detection pixels (3×3). In the 1:3 over-sampling method, even when the departure between the data pixels and the detection pixels occurs, the detection pixel positioned at the center of the 9 detection pixels can detect the beam from the data pixel. Accordingly, everywhere the reproduced image of the data page is located in the light receiving device, it is possible to obtain data with high reliability from the image detected by the center detection pixel.

However, in the 1:3 over-sampling method, since 9 detection pixels are required for detecting one data pixel at the time of detecting the image, the storage density is too low. For example, when a light receiving device having 1200×1200 detection pixels is used, one data page can contain 400×400 pixels of data. Accordingly, stability of a system can be secured, but the storage capacity which is the best advantage of a holographic memory is degraded.

3. 1:2 Over-sampling Method

A 1:2 over-sampling method is a method of detecting one data pixel by the use of 4 detection pixels (2×2). In the 1:2 over-sampling method, similarly to the 1:3 over-sampling method, even when a departure occurs between the data pixels and the detection pixels, one detection pixel of the 4 detection pixels can detect the beam from the data pixel. Accordingly, it is possible to obtain data with high reliability. However, in comparison with the pixel matching method, the 1:2 over-sampling method has a disadvantage that the storage density is 25% of that of the pixel matching method.

The known pixel matching method has an advantage of a large storage density but has a disadvantage of misalignment between pixels. The known 1:3 over-sampling method and 1:2 over-sampling method have an advantage of high reliability in detecting data but have a disadvantage of too small storage density. Therefore, an optical information detecting method capable of securing reliability in data detection and satisfying a high storage density has been required.

SUMMARY

The present invention is contrived to solve the above-mentioned problems. An object of the invention is to provide an optical information detecting method and an optical information detector which can efficiently detect optical information stored in an optical information storage medium by using a 1:N over-sampling method (where N is greater than 1).

According to an aspect of the invention, there is provided an optical information detecting method comprising: detecting an image of a source data page containing a frame mask by the use of an optical detection region within respective 1:N (where N is greater than 1) excessive detection pixels; monitoring a light intensity of the detected image and determining a matching state of the frame mask; determining an arrangement pattern of valid detection pixels of the detection pixels in accordance with the determined matching state of the frame mask and detecting sampling detection pixels; and sampling an image of the sampling detection pixels from the detected image and reproducing the image of the source data page.

According to another aspect of the invention, there is provided an optical information detector comprising: an optical detection unit detecting an image of a source data page containing a frame mask by the use of an optical detection region within respective 1:N (where N is greater than 1) excessive detection pixels; a frame mark matching determination unit monitoring a light intensity of the detected image and determining a matching state of the frame mask; a sampling detection pixel detecting unit determining an arrangement pattern of valid detection pixels of the detection pixels in accordance with the determined matching state of the frame mask and detecting sampling detection pixels; and a sampling unit sampling an image of the detected sampling detection pixels.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram illustrating a configuration of an optical information reproducing apparatus having an optical information detector according to an exemplary embodiment of the invention;

FIG. 2 is a block diagram illustrating a configuration of the optical information detector shown in FIG. 1;

FIG. 9A is a diagram illustrating an example in which the vertical frame mark and the horizontal frame mark are both matched like as a result of monitoring light intensity;

DESCRIPTION OF EXEMPLARY EMBODIMENTS

Figure 3:
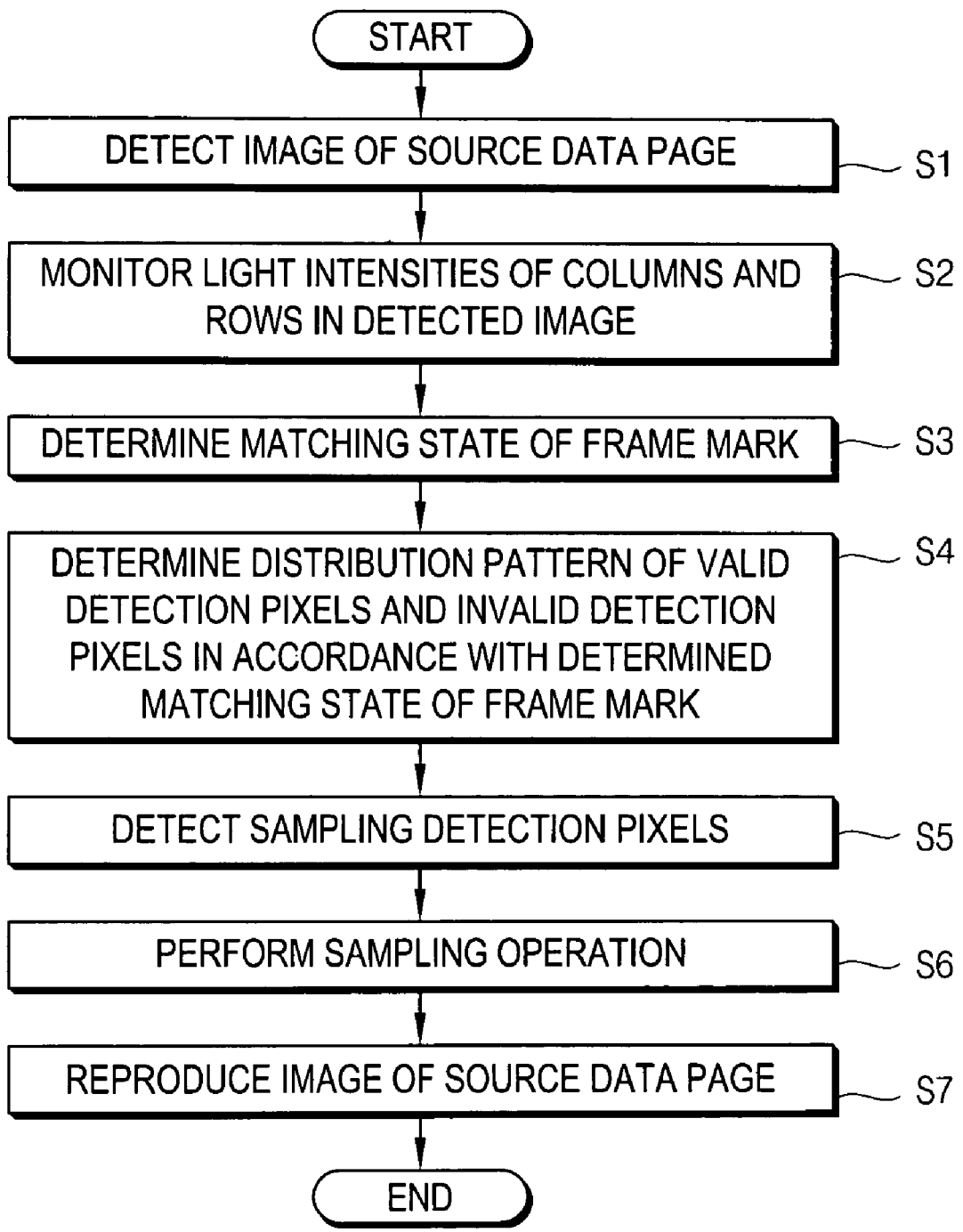
FIG. 3 is a flowchart illustrating a flow of operations of the optical information detector shown in FIG. 2.

Hereinafter, exemplary embodiments of the present invention will be described with reference to the attached drawings.

FIG. 1 is a block diagram illustrating a configuration of an optical information reproducing apparatus having an optical information detector according to an exemplary embodiment of the invention.

As shown in FIG. 1, the optical information reproducing apparatus includes a beam irradiator 10 generating a beam such as a laser beam and irradiating the beam to an optical information storage medium 20. The beam irradiated from the beam irradiator 10 is incident on the optical information storage medium 20 at a predetermined angle. A plurality of data pages are stored in the form of interference patterns in the optical information storage medium 20. The beam irradiated from the beam irradiator 10 may be one of a reference beam for reproducing an interference pattern stored in the optical information storage medium 20 and a phase-conjugation reference beam.

When the beam is incident on the interference pattern stored in the optical information storage medium 20, an image of a data page is reproduced by diffraction of the interference pattern. The reproduced image of the data page is detected by an optical information detector 100. The detected image of the data page is converted into binary data by a signal processor 30, is decoded by a decoder 40, and is reproduced as original data.

FIG. 2 is a block diagram illustrating a configuration of the optical information detector 100 shown in FIG. 1 and FIG. 3 is a flowchart illustrating a flow of operations of the optical information detector 100 shown in FIG. 1.

Referring to FIGS. 2 and 3, an optical detection unit 110 detects an image of a data page which is stored in the optical information storage medium 20 and is reproduced by the reference beam, that is, an image of a source data page, by the use of 1:N (where N is greater than 1) excessive detection pixels (operation S1).

Here, the 1:N excessive detection pixel means that an optical system is constructed so that one data pixel of the source data page corresponds to N×N detection pixels.

For examples, in case of 1:1.5 excessive detection pixels in which N is 1.5, one data pixel corresponds to 1.5×1.5 detection pixels and 2×2 data pixels correspond to 3×3 detection pixels. In case of 1:1.33 excessive detection pixels in which N is 1.33, one data pixel corresponds to 1.33 detection pixels and 3×3 data pixels correspond to 4×4 detection pixels.

Preferably, in the optical detection unit 110, the 1:N excessive detection pixels are arranged, that is, the detection pixels are arranged at a ratio of N×N detection pixels per 1×1 data pixel of a data page. The detection pixels detect images of the data pixels by the use of optical detection regions having a size smaller than that of each detection pixel.

Figure 4:
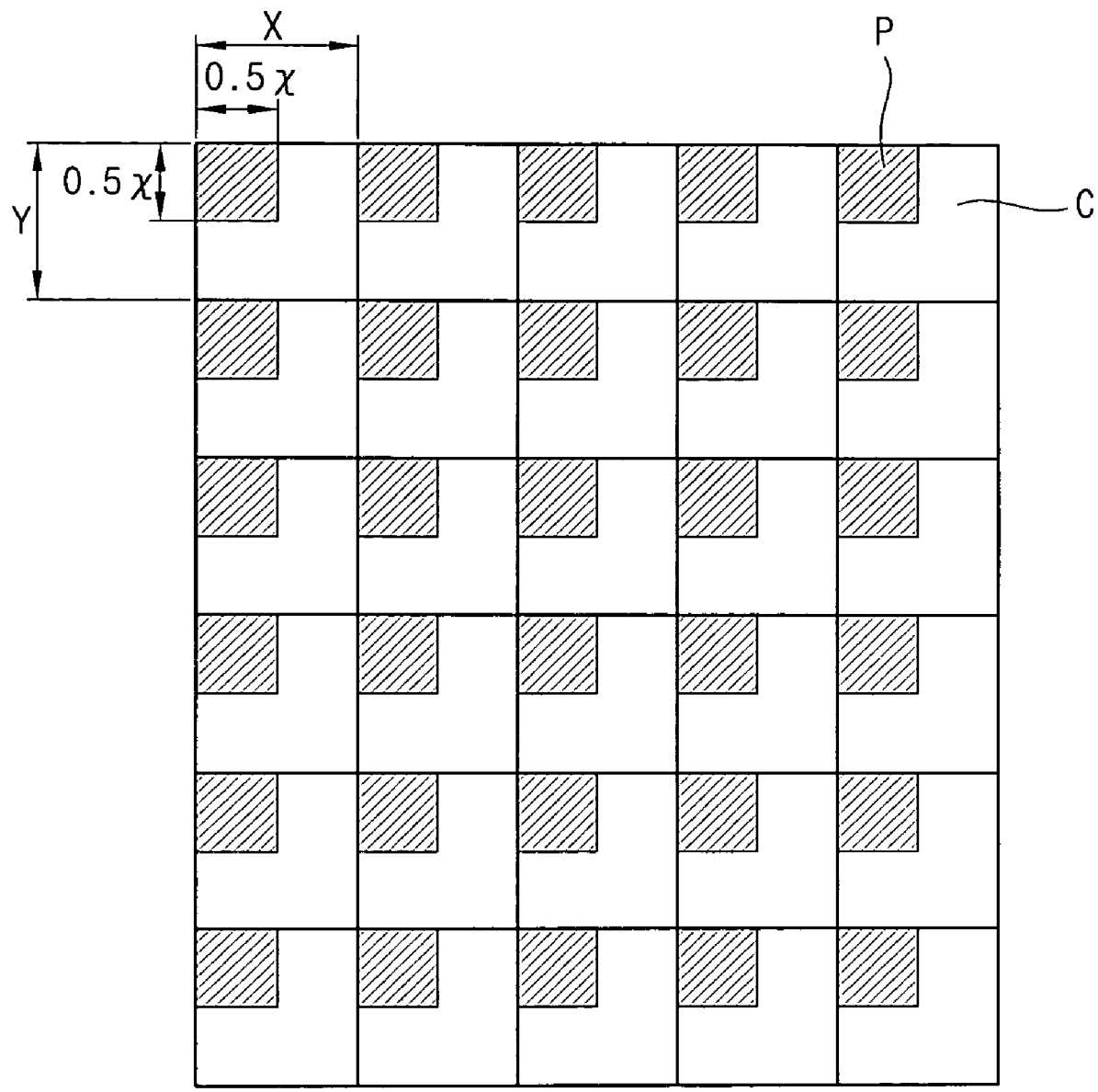
FIG. 4 is a block diagram illustrating an arrangement structure of detection pixels of an optical detection unit.

FIG. 4 is a block diagram illustrating an arrangement structure of detection pixels of the optical detection unit 110. Grids shown in FIG. 4 denote the detection pixels, and hatched portions in the detection pixels denote optical detection regions for actually detecting an image.

As shown in FIG. 4, each detection pixel C includes a optical detection region P having a horizontal width and a vertical width smaller than the horizontal width and the vertical width of the corresponding detection pixel C.

For example, the horizontal width and the vertical width of the optical detection region P can be half the horizontal width and the vertical width of the detection pixel C. That is, when it is assumed that the horizontal width and the vertical width of the detection pixel C are X and Y, respectively, the horizontal width and the vertical width of the optical detection region P are expressed by 0.5X and 0.5Y.

The optical detection region P can be disposed at a variety of positions in the detection pixel P. In FIG. 4, each optical detection region P is disposed at the upper-left portion of the corresponding detection pixel C. However, the optical detection region P may be positioned at the center or at the lower-right portion of the detection pixel C. Preferably, the optical detection regions P are disposed at the same portions of the detection pixels C, respectively.

The detection pixels C may be complementary metal-oxide semiconductor (CMOS) pixels or charge-coupled device (CCD) pixels. The optical detection regions P are actual light receiving portions of the CMOS pixels or the CCD pixels and regions other than the optical detection regions P are light non-receiving regions such as circuit areas.

On the other hand, a frame mark matching determination unit 120 monitors light intensity of the image detected by the optical detection unit 110 (operation S2) to detect a frame mark region, and analyzes a light intensity distribution of the frame mark region to determine the matching state of the frame mark (operation S3).

Figure 5:
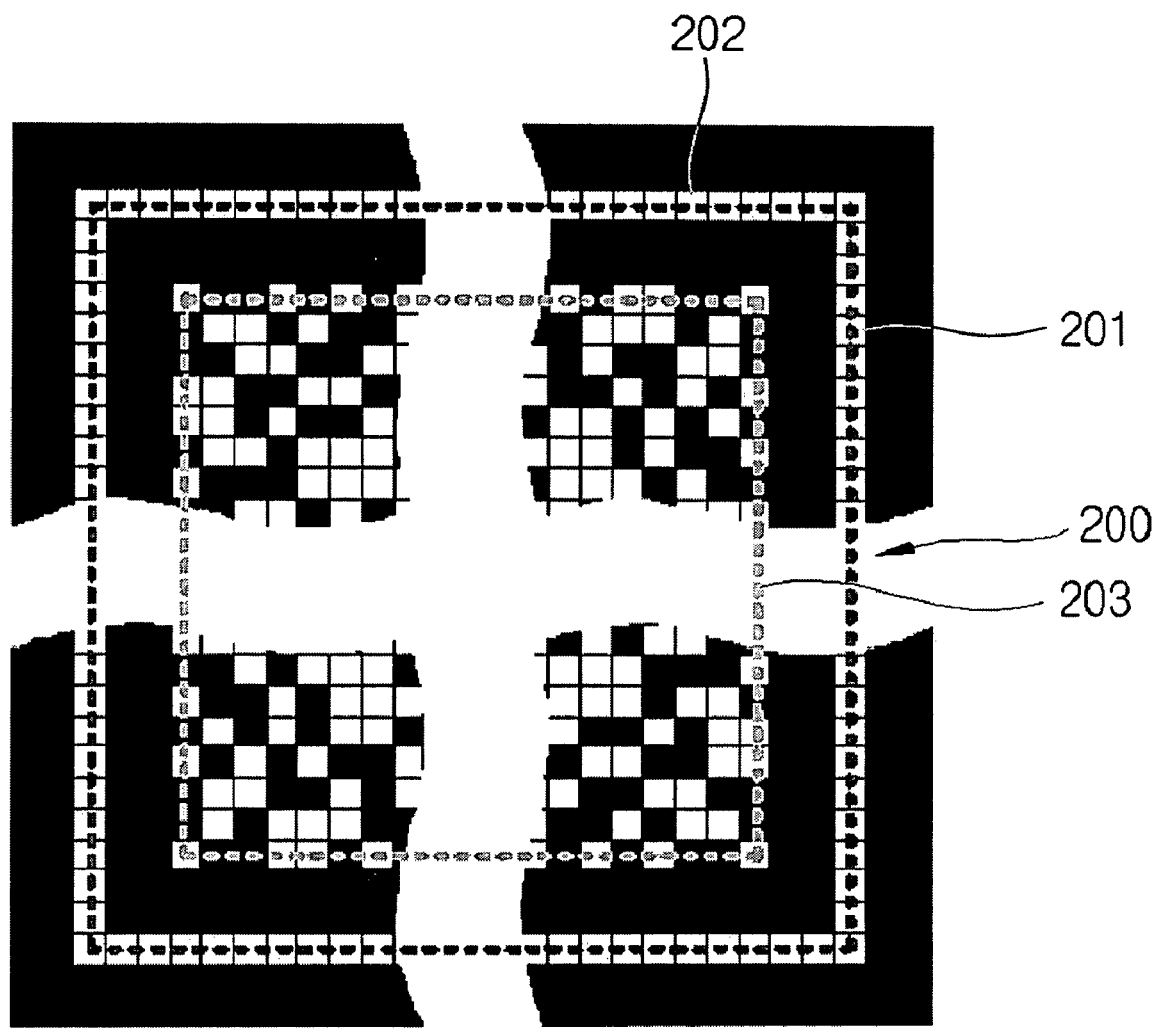
FIG. 5 is a diagram illustrating an image of a source data page.

The frame mark region means a region detected corresponding to a frame mark of the source data page. FIG. 5 is a diagram illustrating an image of the source data page. As shown in FIG. 5, the data page 200 includes a data region 203 having data information and frame marks 201 and 202 for identifying the data region 203. The frame marks 201 and 202 are generally disposed in the form of a frame of the data page, and include a horizontal frame mark 202 and a vertical frame mark 201. A different form of frame marks, not the form of a frame, may be used as needed.

Since ON pixels are continuously arranged in the frame marks for the purpose of easy identification, the frame mark has a large light intensity. Accordingly, the frame mark matching determination unit 120 can easily detect a vertical frame mark region and a horizontal frame mark region by detecting columns or rows having light intensity much larger than that of other portions from the image detected by the optical detection unit 110.

In the frame mark regions, the frame marks are detected by 1:1.5 excessive detection pixels. Accordingly, even though a frame mark of a source data page has a line of data pixels, the frame mark can be detected by plural lines of detection pixels. For example, the frame mark may be detected by three lines of detection pixels.

Therefore, by monitoring light intensity distributions of columns and rows in the detected frame mark regions, the actual matching state of the frame marks can be determined.

Figure 6A:
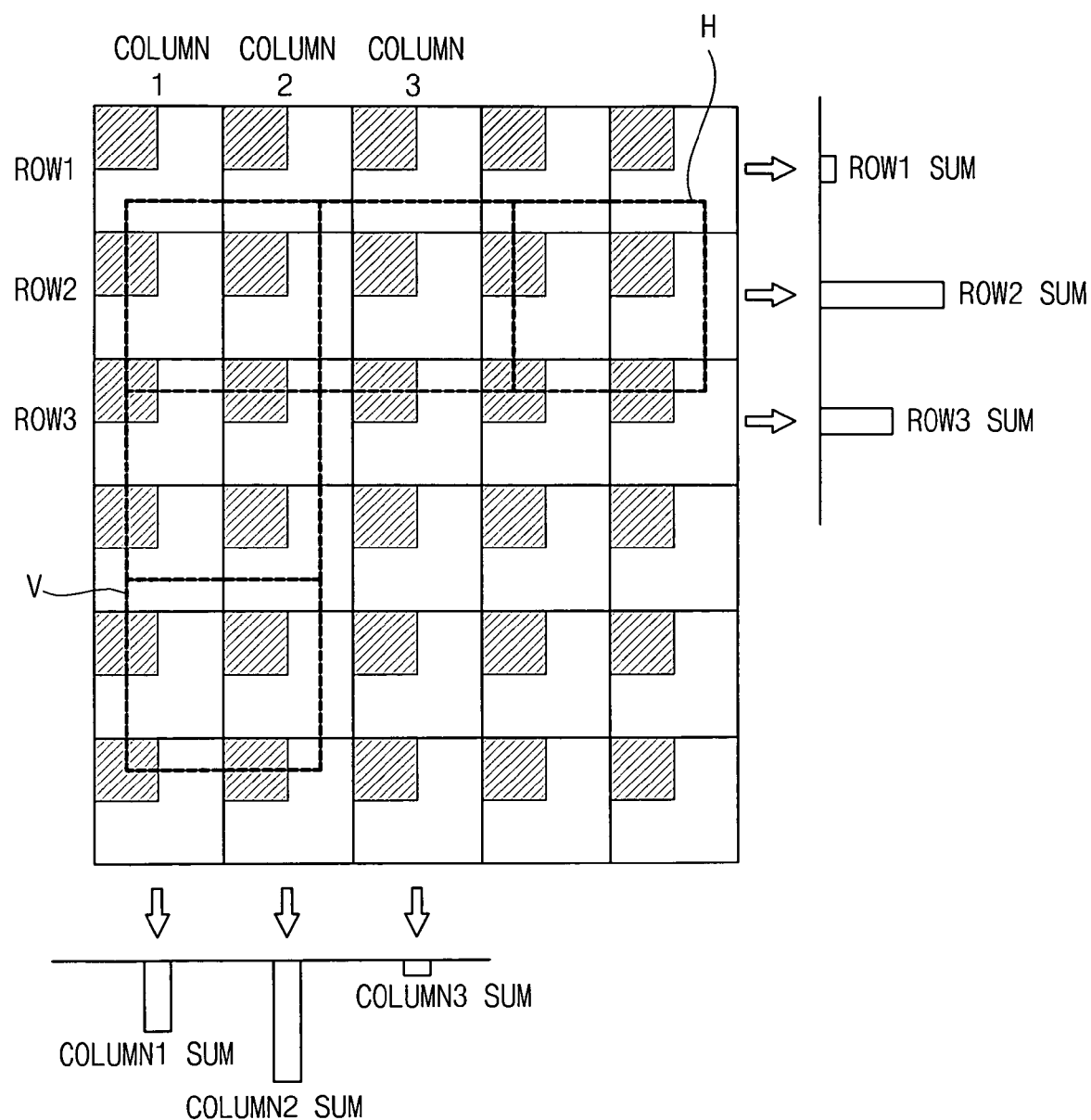
FIG. 6A is a diagram illustrating a matching state of a frame mark with a light intensity distribution of a detected image.

FIG. 6A is a diagram illustrating a matching state of a frame mark with a light intensity distribution of a detected image. In FIG. 6A, small grids denote the detection pixels, hatched portions in the small grids denote the optical detection regions, and large grids indicated by dotted lines denote the data pixels. Graphs illustrated in the right and lower side of the figure show sums of light intensities in rows of detection pixels and columns of detection pixels.

As shown in FIG. 6A, three lines of detection pixels should be considered so as to detect the matching states of the frame marks V and H formed out of one line of data pixels. The three lines of detection pixels include a line having the largest light intensity and a neighboring line thereof in the detected image.

That is, three column lines of detection pixels Column 1, Column 2, and Column 3 are considered so as to detect the matching state of the vertical frame mark V. By observing the light intensity distributions of the three column lines of detection pixels, it can be seen that the light intensity of Column 2 is largest, the light intensity of Column 1 is smaller than the light intensity of Column 2, and the light intensity of Column 3 is very small.

Accordingly, it can be seen that the vertical frame mark V is mainly detected from the optical detection regions of the detection pixels in Column 2 and partially detected from the optical detection regions of the detection pixels in Column 1. As a result, it can be determined that the vertical frame mark V is in a non-matched in FIG. 6A.

Three row lines of detection pixels Row 1, Row 2, and Row 3 are considered so as to detect the matching state of the horizontal frame mark H. By observing the light intensity distributions of the three row lines of detection pixels, it can be seen that the light intensity of Row 2 is largest, the light intensity of Row 3 is smaller than the light intensity of Row 2, and the light intensity of Row 1 is very small.

Accordingly, it can be seen that the horizontal frame mark H is mainly detected from the optical detection regions of the detection pixels in Row 2 and partially detected from the optical detection regions of the detection pixels in Row 3. As a result, it can be determined that the horizontal frame mark H is in a non-matched in FIG. 6A.

Through this determination operation, the frame mark matching determination unit 120 can determine the matching states of the vertical frame mark and the horizontal frame mark. Other examples are described with reference to FIGS. 6B and 6C.

Figure 6B:
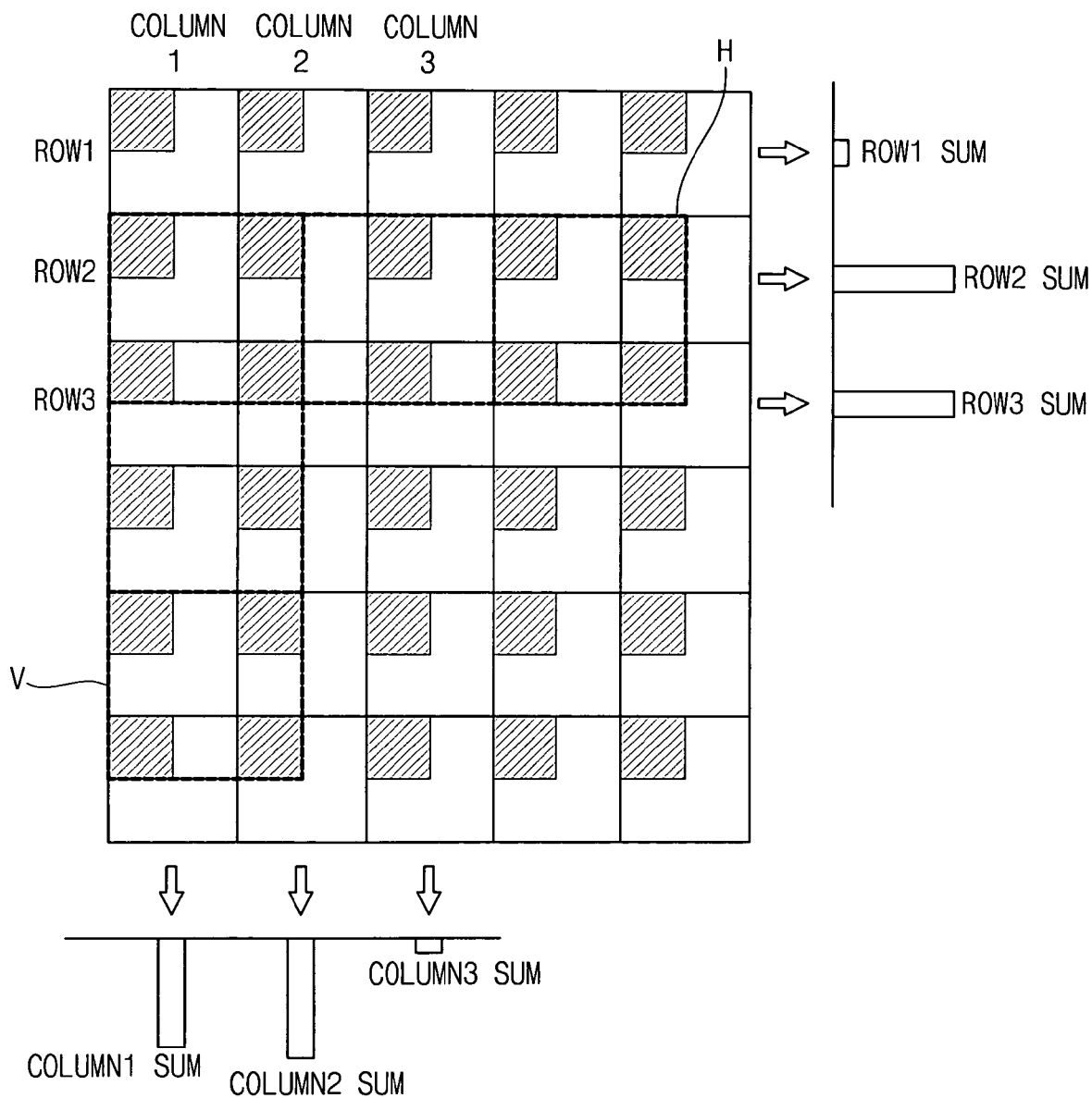
FIG. 6B is a diagram illustrating a matching state of a frame mark with another light intensity distribution of a detected image.

FIG. 6B is a diagram illustrating a matching state of a frame mark with another light intensity distribution of a detected image. While it is shown in FIG. 6A that the frame marks are not matched with the detection pixels, it is shown in FIG. 6B that the frame marks are matched with the detection pixels.

As shown in FIG. 6B, by observing the light intensity distributions of the three column lines of detection pixels to determine the matching state of the vertical frame mark V, it can be seen that the light intensity of Column 2 is largest, the light intensity of Column 1 is almost similar to the light intensity of Column 2, and the light intensity of Column 3 is very small.

Accordingly, it can be seen that the vertical frame mark V is mainly detected from the optical detection regions of the detection pixels in Column 2 and Column 1. As a result, it can be determined that the vertical frame mark V is in a matched state in FIG. 6B.

By observing the light intensity distributions of the three row lines of detection pixels to determine the matching state of the horizontal frame mark H, it can be seen that the light intensity of Row 2 is largest, the light intensity of Row 3 is almost similar to the light intensity of Row 2, and the light intensity of Row 1 is very small.

Accordingly, it can be seen that the horizontal frame mark H is mainly detected from the optical detection regions of the detection pixels in Row 2 and Row 3. As a result, it can be determined that the horizontal frame mark H is in a matched state in FIG. 6B.

Figure 6C:
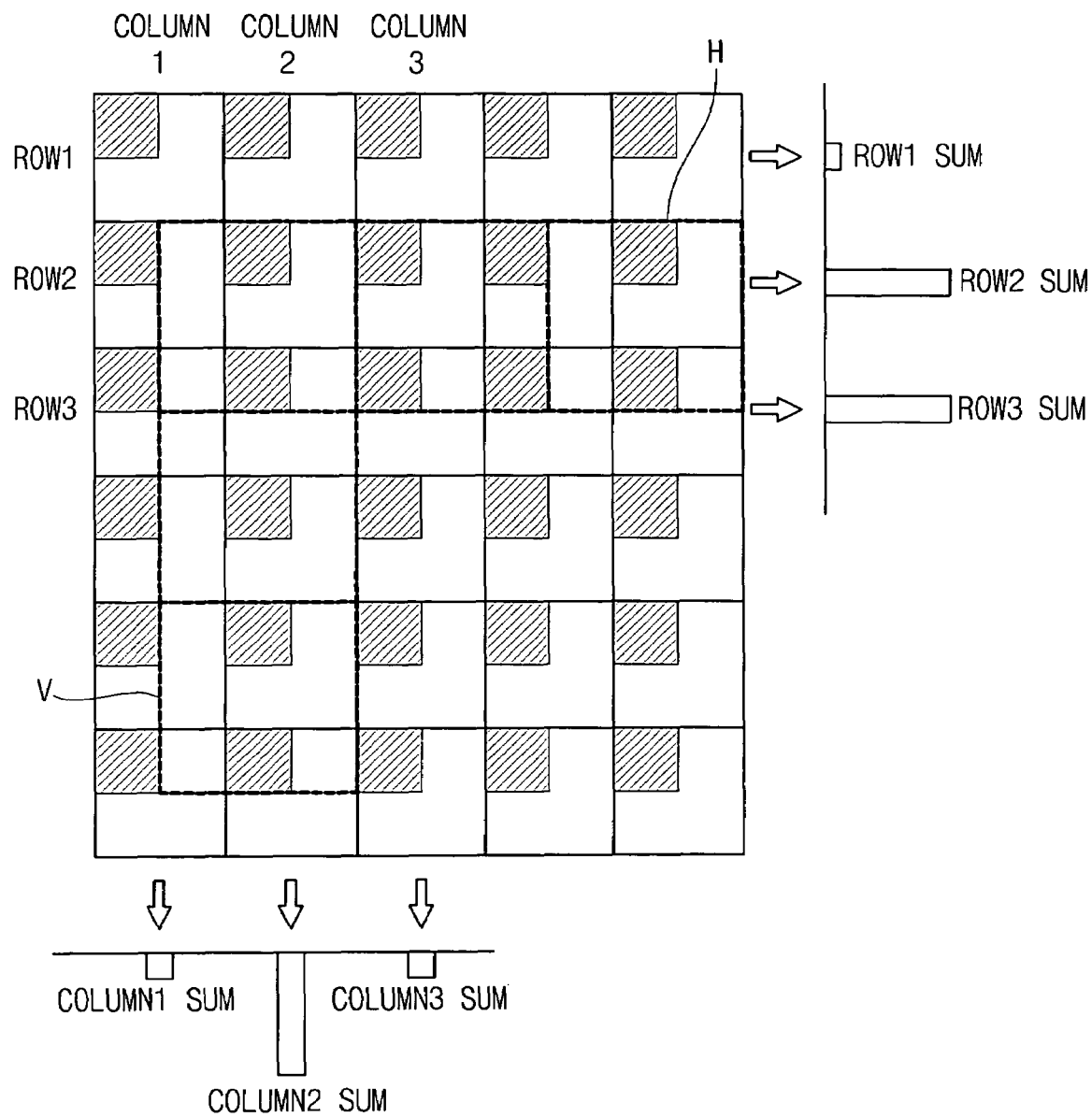
FIG. 6C is a diagram illustrating a matching state of a frame mark with another light intensity distribution of a detected image.

FIG. 6C is a diagram illustrating a matching state of a frame mark with another light intensity distribution of a detected image, in which the frame marks are matched with the detection pixels in a type different from that of FIG. 6B.

As shown in FIG. 6C, by observing the light intensity distributions of the three column lines of detection pixels to determine the matching state of the vertical frame mark V, it can be seen that the light intensity of Column 2 is largest and the light intensities of Column 1 and Column 3 are very small.

Accordingly, it can be seen that the vertical frame mark V is mainly detected from the optical detection regions of the detection pixels in Column 2. As a result, it can be determined that the vertical frame mark V is in a matched state in FIG. 6C.

By observing the light intensity distributions of the three row lines of detection pixels to determine the matching state of the horizontal frame mark H, it can be seen that the light intensity of Row 2 is largest, the light intensity of Row 3 is almost similar to the light intensity of Row 2, and the light intensity of Row 1 is very small.

Accordingly, it can be seen that the horizontal frame mark H is mainly detected from the optical detection regions of the detection pixels in Row 2 and Row 3. As a result, it can be determined that the horizontal frame mark H is in a matched state in FIG. 6C.

When the matching states of the frame marks are determined in this way, a sampling detection pixel detecting unit 130 determines a distribution of valid detection pixels and invalid detection pixels corresponding to the determined matching state of the frame marks (operation S4), and then detects sampling detection pixels using the determination result (operation S5).

Figure 7A:
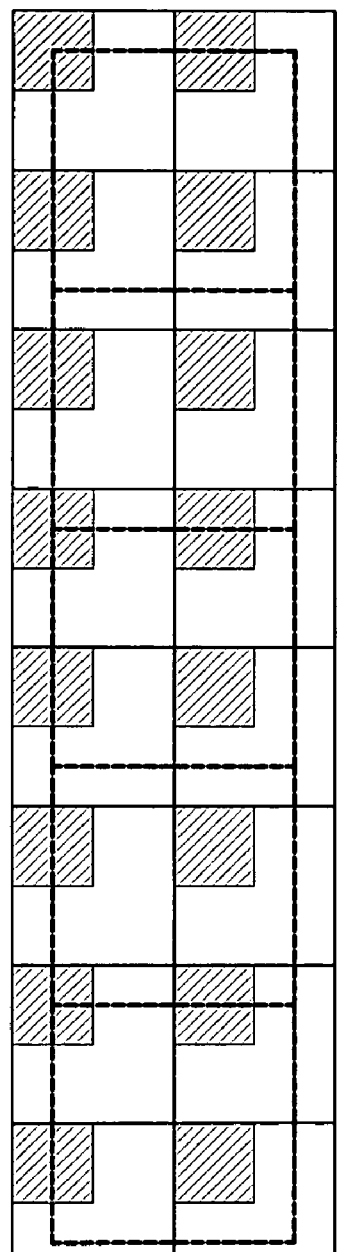
FIG. 7A is a diagram illustrating a distribution of valid detection pixels and invalid detection pixels in column lines of detection pixels when a vertical frame mark is in a non-matched state.

FIG. 7A is a diagram illustrating a distribution of valid detection pixels and invalid detection pixels in the column lines of detection pixel when the vertical frame mark is in the non-matched state. In FIG. 7A, the small grids denote the detection pixels and the hatched portions denote the optical detection regions. The large grids indicated by the dotted lines denote the data pixels.

Referring to FIG. 7A, when the vertical frame mark is in the non-matched state shown in FIG. 6A, the valid detection pixels and the invalid detection pixels in the column lines of detection pixels exhibit a regular pattern. That is, two valid detection pixels and one invalid detection pixel are continuously arranged. This arrangement is true of all the column lines of detection pixels in the horizontal direction. Accordingly, by monitoring an asymmetrical feature of the vertical frame mark, it is possible to determine the type of the detection pixels in the horizontal direction.

Here, the valid detection pixel means a detection pixel exactly corresponding to one data pixel and the invalid detection pixel means a detection pixel corresponding to a mixture of a plurality of data pixels.

Figure 7B:
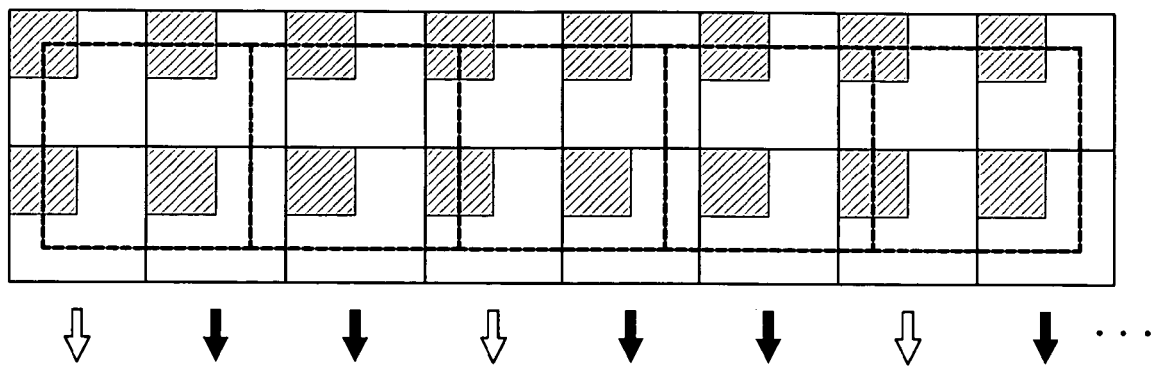
FIG. 7B is a diagram illustrating a distribution of valid detection pixels and invalid detection pixels in row lines of detection pixels when a horizontal frame mark is in a non-matched state.

FIG. 7B is a diagram illustrating a distribution of the valid detection pixels and the invalid detection pixels in row lines of detection pixels when the horizontal frame mark is in the non-matched state.

Referring to FIG. 7B, when the horizontal frame mark is in the non-matched state shown in FIG. 6A, the valid detection pixels and the invalid detection pixels in the row lines of detection pixels exhibit a regular pattern. That is, two valid detection pixels and one invalid detection pixel are continuously arranged. This arrangement is true of all the row lines of detection pixels in the vertical direction. Accordingly, by monitoring an asymmetrical feature of the vertical frame mark, it is possible to determine the type of the detection pixels in the vertical direction.

Figure 7C:
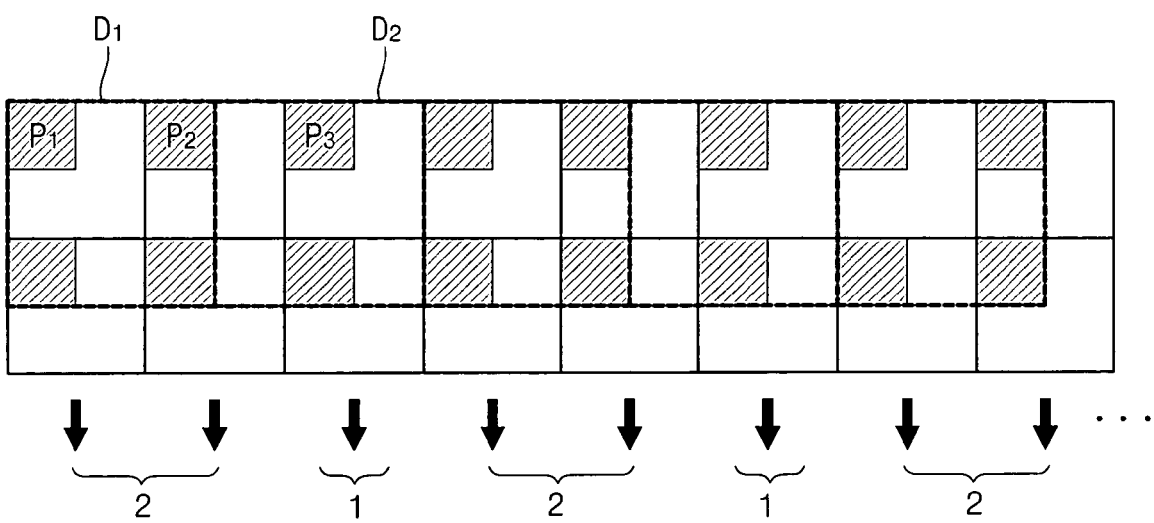
FIG. 7C is a diagram illustrating a distribution of valid detection pixels and invalid detection pixels in row lines of detection pixels when a horizontal frame mark is in a matched state.

FIG. 7C is a diagram illustrating a distribution of the valid detection pixels and the invalid detection pixels in the row lines of detection pixels when a horizontal frame mark is in a matched state.

Referring to FIG. 7C, when the horizontal frame mark is in the matched state shown in FIG. 6B, only the valid detection pixels exist in the row lines of detection pixels. That is, it can be said that the detection pixels in the row lines of detection pixels are correctly aligned.

The valid detection pixels have two types. For example, in one type, a data pixel D1 is detected by the optical detection regions P1 and P2 of two detection pixels. In the other type, a data pixel D1 is detected by only the optical detection region P3 of one detection pixel.

Accordingly, when the horizontal frame mark is in the matched state shown in FIG. 6B, a pattern in which two subsequent pixels detect the same data pixel and the next detection pixel detects another data pixel is repeated. Therefore, the pattern of 2-1-2-1- . . . should be considered at the time of sampling. Similarly, when the vertical frame mark is in the matched state shown in FIG. 6C, the pattern of 1-2-1-2- . . . should be considered. These patterns are described again later.

Figure 8A:
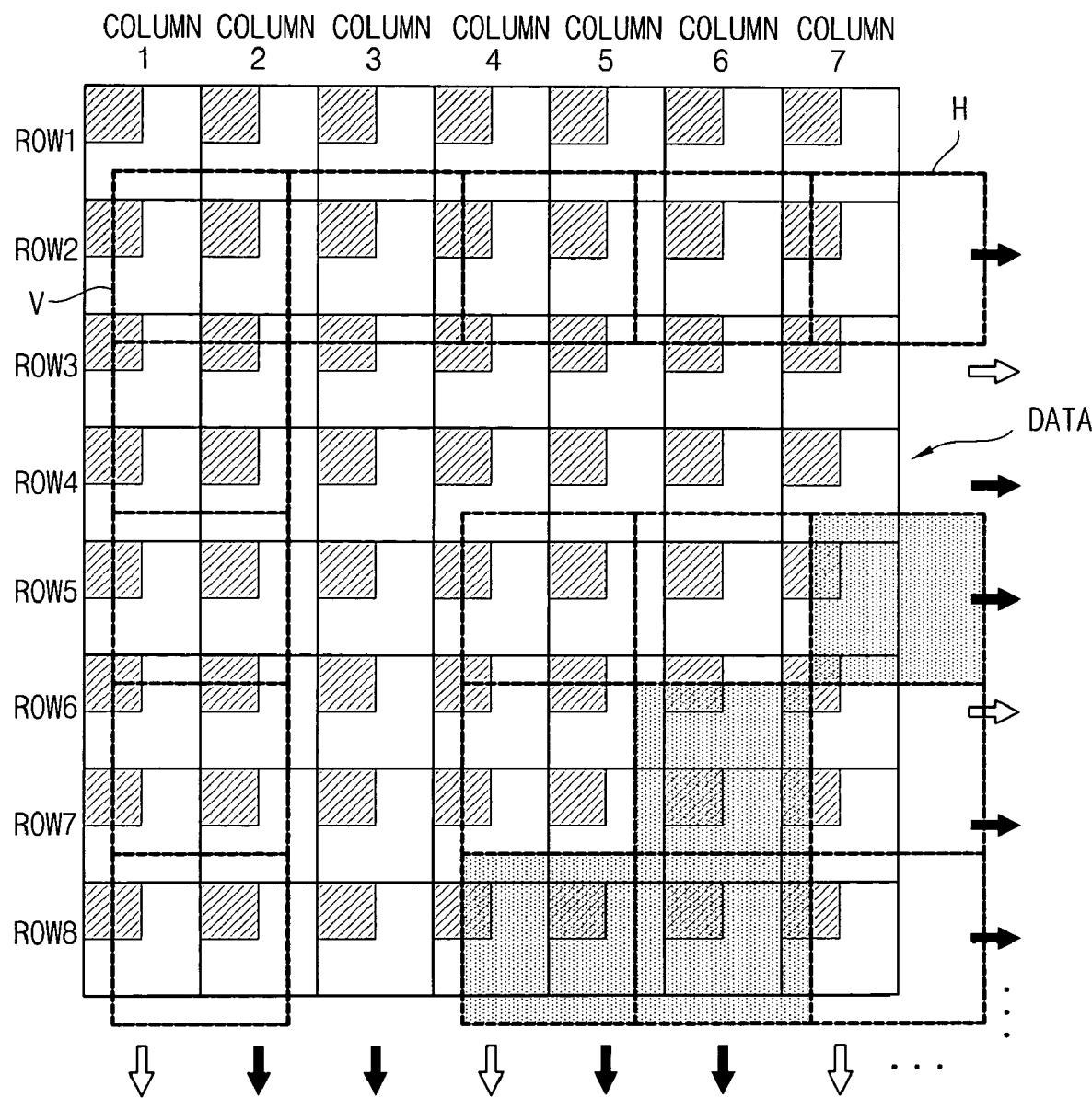
FIG. 8A is a diagram illustrating an example in which the vertical frame mark and the horizontal frame mark are in a non-matched state like in FIG. 6A as a result of monitoring light intensity.

FIG. 8A is a diagram illustrating an example in which the vertical frame mark and the horizontal frame mark are in the non-matched state like in FIG. 6A as a result of monitoring light intensity. In FIG. 8A, the small grids denote the detection pixels and the hatched portions in the small grids denote the optical detection regions. The large grids denote the data pixels. Here, portions marked in dark in the large grids denote data pixels having an OFF value and portions not marked in dark denote data pixels having an ON value.

Referring to FIG. 8A, it can be seen that the vertical frame mark and the horizontal frame mark are all in the non-matched state. In this case, as described above, two valid detection pixels and one invalid detection pixel are alternately arranged in all the columns. In addition, two valid detection pixels and one invalid detection pixel are alternately arranged in all the rows.

Here, the line of detection pixels having the largest light intensity, which was used for determining the matching state of the frame marks, can be used as a reference line of detection pixels which serves as a reference for this distribution. The start of the pattern can be determined by a line of detection pixels next to the reference line of detection pixels.

For example, the reference line of detection pixels from which the pattern of the column lines of detection pixels is started may be the row line Row 2 of detection pixels from which the horizontal frame mark is detected. That is, the column lines of detection pixels are arranged from the column line Row2. In addition, the next column line Row 3 have a small light intensity and is determined as a line of invalid detection pixels at the time of determining the matching state of the frame marks. Accordingly, Row4 is a line of valid detection pixels, Row5 is a line of valid detection pixels, Row6 is a line of invalid detection pixels, Row7 is a line of valid detection pixels, and Row8 is a line of valid detection pixels.

Similarly, a reference line of detection pixels from which the pattern of the row lines of detection pixels is started may be the column line Column2 from which the vertical frame mark is detected.

Therefore, the sampling detection pixel detecting unit 130 detects the detection pixels at intersections between the column lines of valid detection pixels and the row lines of valid detection pixels as the sampling detection pixels among the detection pixels in the data region, by using the vertical and horizontal arrangements of the valid detection pixels and the invalid detection pixels.

For example, in FIG. 8A, the detection pixels (Row5, Column5), (Row5, Column6), (Row7, Column5), (Row7, Column6), (Row8, Column5), and (Row8, Column6) in which the lines of valid detection pixels intersect each other in the vertical and horizontal directions can be detected as the sampling detection pixels.

When the sampling detection pixels are detected in this way, the sampling unit 140 samples the detected sampling pixels (operation S6) and reproduces an image of the original data page (operation S7).

Figure 8B:
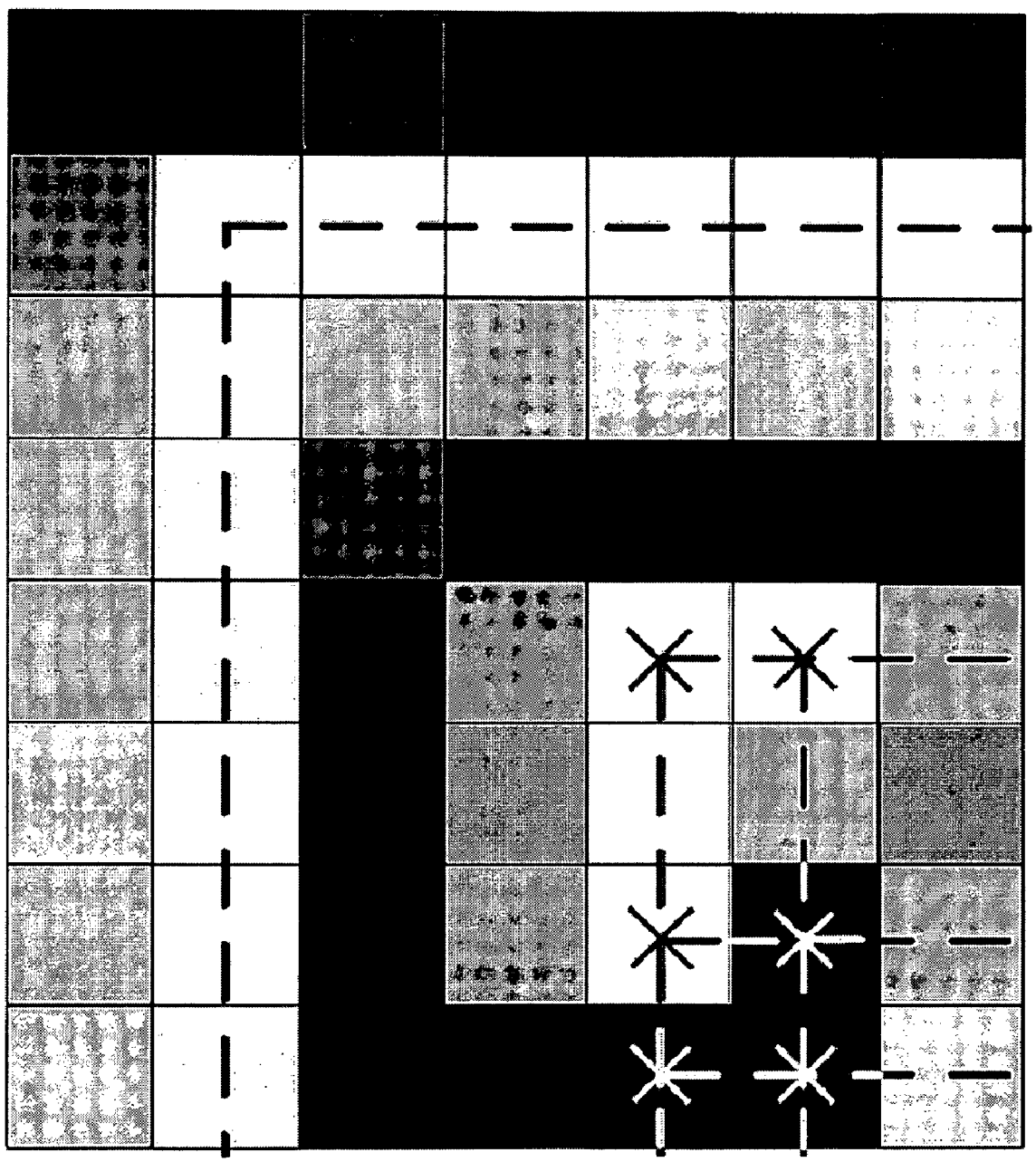
FIG. 8B is a diagram illustrating an image of the detection pixels shown in FIG. 8A.
Figure 8C:
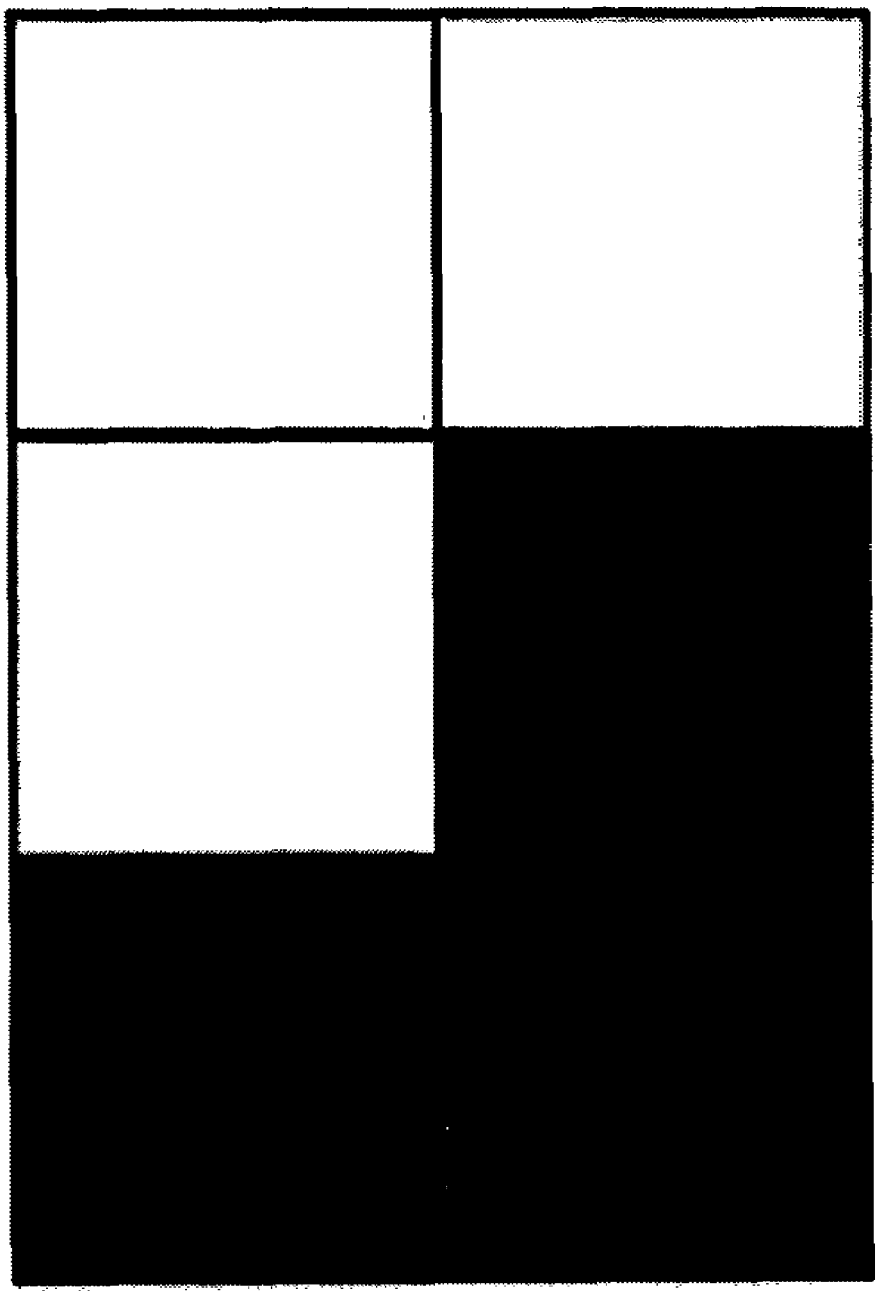
FIG. 8C is a diagram illustrating an image reproduced using the sampling detection pixels shown in FIG. 8B.

FIG. 8B is a diagram illustrating an image of the detection pixels shown in FIG. 8A and FIG. 8C is a diagram illustrating an image reproduced using the sampling detection pixels shown in FIG. 8B.

By sampling the detection pixels at the intersections indicated by X in FIG. 8B, the image shown in FIG. 8C is reproduced. The reproduced image exactly corresponds to image values of the data pixels shown in FIG. 8A.

FIG. 9A is a diagram illustrating an example in which the vertical frame mark and the horizontal frame mark are both in the matched state as a result of monitoring the light intensities. In FIG. 9A, the small grids denote the detection pixels and the hatched portions in the small grids denote the optical detection regions. The large grids denote the data pixels. Here, the portions marked in dark in the large grids denote the data pixels having an OFF value and the portions not marked in dark denote the data pixels having an ON value.

Referring to FIG. 9A, it can be seen that the vertical frame mark and the horizontal frame mark are both in the matched state. In this case, as described above, the detection pixels in all the columns are valid detection pixels and the detection pixels in all the rows are invalid detection pixels.

In this case, even though all the detection pixels in the reproduced image are valid detection pixels, one data pixel can be detected by two detection pixels for the reason of a ratio of data pixel to detection pixel. One example is shown in FIG. 7C.

Therefore, when two detection pixels detect one data pixel, only one detection pixel should be selected as the sampling detection pixel. In this case, one of the lines of detection pixels from which the frame mark is detected is selected and the sampling detection pixels are selected from the selected line of detection pixel.

For example, in FIG. 9A, the vertical frame mark is detected from the two column lines of detection pixels, that is, Column1 and Column2. Accordingly, the pattern of 2-1-2-1 . . . is obtained from the next column lines of detection pixels. That is, Column 3 detects an image of one line of data pixels, Column 4 and Column 5 detect only an image of one line of data pixels, and Column 6 detects an image of one line of data pixel.

In this case, one of Column 1 and Column 2 used for detecting the vertical frame mark is selected and is subjected to an sampling operation. For example, when Column 1 is selected, Column 3 is not a data region and thus passed, Column 4 is selected from Column 4 and Column 5, and then Column 6 is selected. The sampling operation is performed in this pattern.

On the other hand, since the horizontal frame mark is exactly detected by one row line Row 2 of diction pixels, the sampling operation is performed in the pattern of 2-1-2-1- . . . from the next row line of detection pixels. That is, since Row 3 and Row 4 next to Row 2 detect the same data pixel, one should be selected. However, Row 3 and Row 4 are not a data region and thus passed, Row 5 is selected, and then one of Row 6 and Row 7 is selected. The sampling operation is performed in this pattern.

Therefore, by detecting the sampling detection pixels from the intersections between the selected column lines of valid detection pixels and the selected row lines of valid detection pixels, it is possible to reproduce the image of the original data pixels.

Figure 9B:
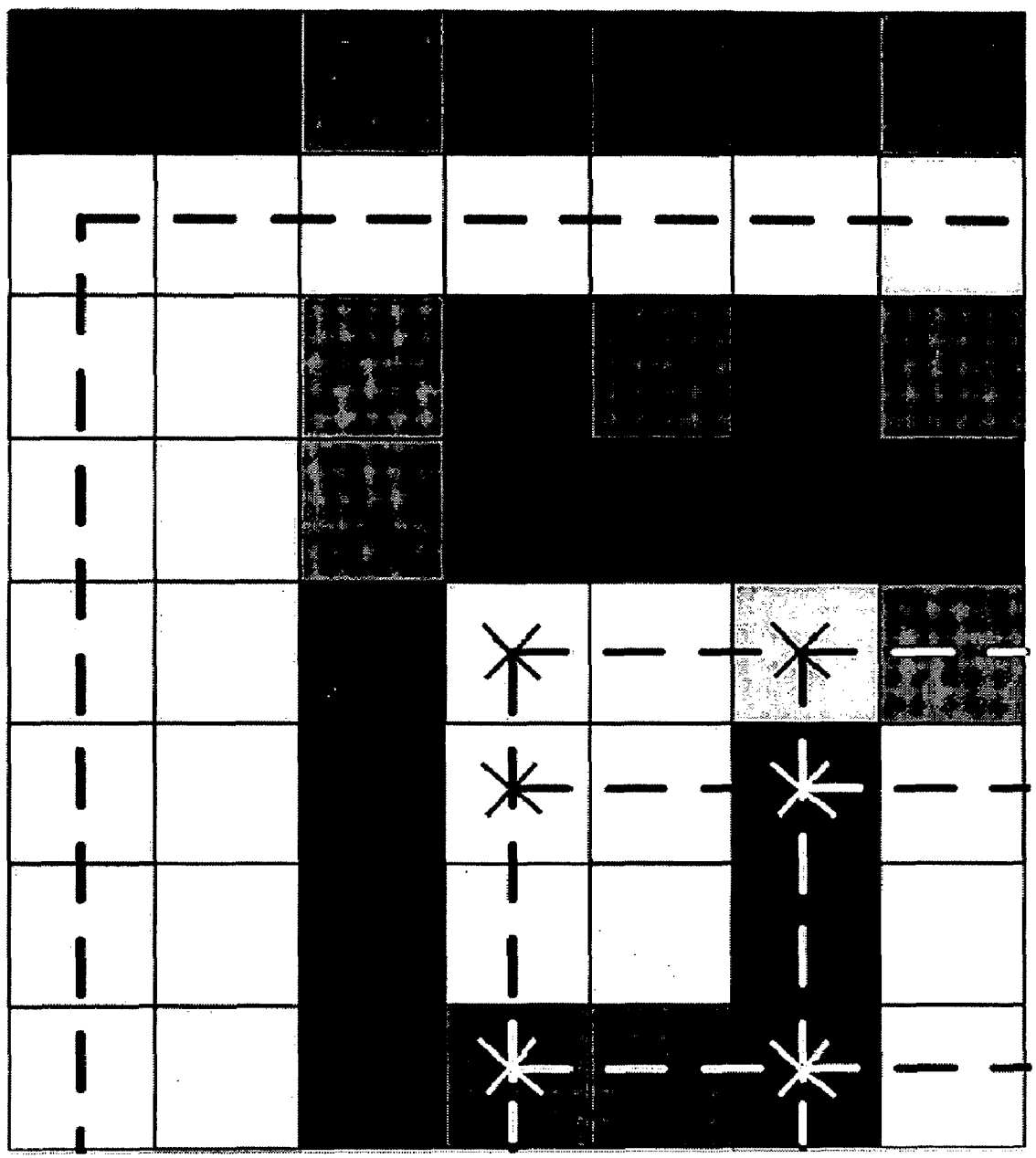
FIG. 9B is a diagram illustrating an image of the detection pixels shown in FIG. 9A.
Figure 9C:
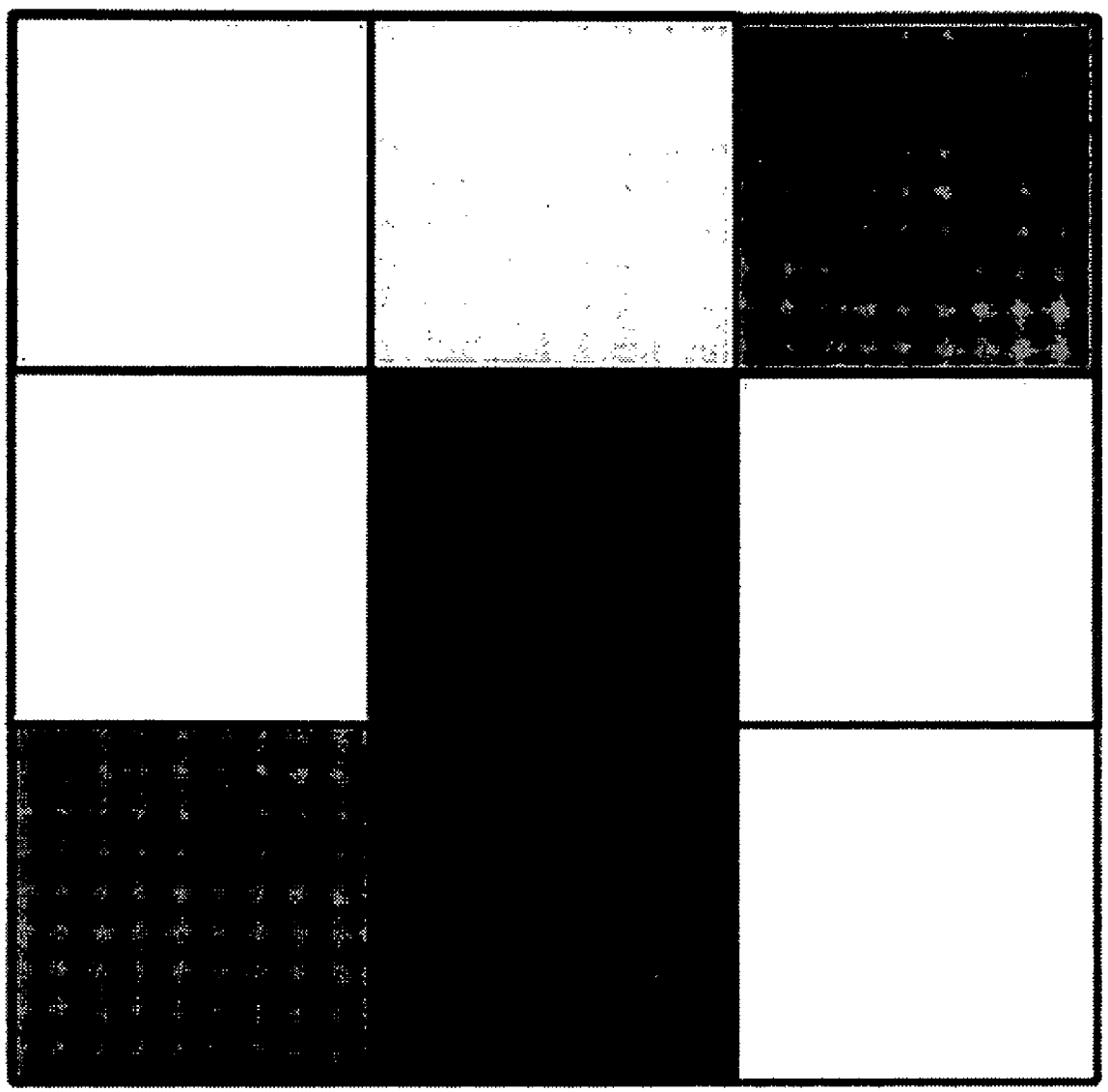
FIG. 9C is a diagram illustrating an image reproduced using the sampling detection pixels shown in FIG. 9B.

FIG. 9B is a diagram illustrating an image of the detection pixels shown in FIG. 9A and FIG. 9C is a diagram illustrating an image reproduced using the sampling detection pixels shown in FIG. 9B.

It can be seen that the image shown in FIG. 9C is detected by sampling the image at the intersections indicated by X in FIG. 9B. It can be also seen that the detected image exactly corresponds to image values of the data pixels shown in FIG. 9A.

As described above, according to the present invention, it is possible to detect optical information with high reliability without performing complex calculation, by using an 1:N over-sampling operation (where N is greater than 1). Therefore, it is possible to efficiently detect optical information.

What is claimed is:

1. An optical information detecting method comprising:
 detecting an image of a source data page containing a frame mask by the use of an optical detection region within respective 1:N (where N is greater than 1) excessive detection pixels;
 monitoring a light intensity of the detected image and determining a matching state of the frame mask;
 determining an arrangement pattern of valid detection pixels of the detection pixels in accordance with the determined matching state of the frame mask and detecting sampling detection pixels; and
 sampling an image of the sampling detection pixels from the detected image and reproducing the image of the source data page.

2. The optical information detecting method according to claim 1, wherein the valid detection pixels are detection pixels, each of which detects an image of a data pixel, among the detection pixels.

3. The optical information detecting method according to claim 1, wherein the determining a matching state of the frame mark comprising: monitoring a light intensity of the detected image and detecting a frame mark detection region which have a light intensity larger than that of other regions; and determining a matching state of the frame mark on the basis of an intensity distribution of the frame mark detection region.

4. The optical information detecting method according to claim 1, wherein the matching state of the frame mark indicates whether the frame mark is matched with the detection pixels or not.

5. The optical information detecting method according to claim 4, wherein the detection pixels in the detected image are all the valid detection pixels when the frame mark is in a matched state.

6. The optical information detecting method according to claim 5, wherein the detecting of the sampling detection pixels comprises selecting valid detection pixels to be sampled on the basis of an arrangement pattern of the valid detection pixels when the frame mark is in the matched state.

7. The optical information detecting method according to claim 4, wherein when the frame mask is in a non-matched state, the valid detection pixels and invalid detection pixels, each of which detects an image of a mixture of a plurality of data pixels, are repeated in a constant pattern in the detected image.

8. The optical information detecting method according to claim 7, wherein the detecting of the sampling detection pixels comprises classifying the detection pixels into the valid detection pixels and the invalid detection pixels on the basis of the arrangement pattern and detecting the valid detection pixels when the frame mark is in the non-matched state.

9. The optical information detecting method according to claim 1, wherein the frame mark includes a vertical frame mark and a horizontal frame mark.

10. The optical information detecting method according to claim 9, wherein the determining of the matching state of the frame mark comprises: monitoring light intensities of columns in the detected image and detecting a vertical frame mark region corresponding to the vertical frame mark; and monitoring light intensities of row in the detected image and detecting a horizontal frame mark region corresponding to the horizontal frame mark.

11. The optical information detecting method according to claim 10, wherein the vertical frame mark region includes a column having the largest light intensity and one or more neighboring columns thereof in the detected image, and the horizontal frame mark region includes a row having the largest light intensity and one or more neighboring columns thereof in the detected image.

12. The optical information detecting method according to claim 9, wherein the detecting of the sampling detection pixels comprises: detecting the valid detection pixels in the horizontal direction and the valid detection pixels in the vertical direction in accordance with the matching state of the horizontal frame mark and the vertical frame mark; and detecting the sampling detection pixels at intersections between the valid detection pixels in the horizontal direction and the valid detection pixels in the vertical direction.

13. An optical information detector comprising: an optical detection unit detecting an image of a source data page containing a frame mask by the use of an optical detection region within respective 1:N (where N is greater than 1) excessive detection pixels; a frame mark matching determination unit monitoring a light intensity of the detected image and determining a matching state of the frame mask; a sampling detection pixel detecting unit determining an arrangement pattern of valid detection pixels of the detection pixels in accordance with the determined matching state of the frame mask and detecting sampling detection pixels; and a sampling unit sampling an image of the detected sampling detection pixels.

14. The optical information detector according to claim 13, wherein the optical detection unit includes the detection pixels which are arranged at a ratio of N.times.N detection pixels per 1.times.1 data pixel of the source data page, and each detection pixel includes an optical detection region which has a size smaller than that of each detection pixel and serves to detect optical information of the data pixels.

15. The optical information detector according to claim 14, wherein each optical detection region has a horizontal width and a vertical width smaller by a half than the horizontal width and the vertical width of each detection pixel.

16. The optical information detector according to claim 13, wherein the frame mark matching determination unit determines whether the frame mark is matched with the detection pixels or not.

17. The optical information detector according to claim 16, wherein the sampling detection pixel detecting unit selects pixels to be sampled from the valid detection pixels on the basis of an arrangement pattern of the valid detection pixels when the frame mark is in a matched state, and the sampling detection pixel detecting unit classifies the detection pixels into the valid detection pixels and the invalid detection pixels and detects the valid detection pixels when the frame mark is in a non-matched state.

18. The optical information detector according to claim 13, wherein the frame mark matching determination unit monitors light intensities of the detected image, detects a frame mark detecting region having a light intensity larger than that of other regions, and determines the matching state of the frame mark by the use of a light intensity distribution of the detected frame mark detecting region.

* * * * *